United States Patent [19]
Maher et al.

[11] 4,119,735
[45] Oct. 10, 1978

[54] CURED MEAT SPREAD AND ITS PREPARATION

[75] Inventors: Robert H. Maher; Lee E. Kraley, both of Fremont, Mich.

[73] Assignee: Gerber Products Company, Fremont, Mich.

[21] Appl. No.: 823,771

[22] Filed: Aug. 11, 1977

[51] Int. Cl.² ............................................. A23B 4/02
[52] U.S. Cl. ................................... 426/264; 426/646
[58] Field of Search .............. 426/264, 266, 392, 646

[56] References Cited

U.S. PATENT DOCUMENTS

| 2,753,269 | 7/1956 | Hawk et al. | 426/646 X |
| 2,908,577 | 10/1959 | Hawk et al. | 426/646 X |
| 3,108,880 | 10/1963 | Wierbicki et al. | 426/264 |

Primary Examiner—Raymond N. Jones
Assistant Examiner—Robert J. Warden
Attorney, Agent, or Firm—Townsend and Townsend

[57] ABSTRACT

A novel cured meat spread prepared by partial size reduction of fresh or frozen, raw meat, partial heating to accomplish protein coagulation, followed by further size reduction, addition of cure and seasoning, completion of heating and hot packaging. In a preferred embodiment, the meat is ham and the fat content thereof is adjusted into the range of 20–35% by total weight of the final product.

8 Claims, No Drawings

CURED MEAT SPREAD AND ITS PREPARATION

The present invention relates to an edible, cured meat product containing particulate portions and to the process for preparing it in the form of a spread.

BACKGROUND OF THE INVENTION

Products containing meat such as ham, prepared commercially as a spread in a ready-to-eat form for human consumption, are known to be appetizing as well as beneficial. It is known, for example, to subject various fresh meats, including ham, to an initial cure through the application of a mixture of sodium chloride, sodium nitrate, sodium nitrite and sugar. Such conventional curing procedures are usually accomplished either by applying the curing materials in a dry form to the surface of the fresh raw ham and allowing it to remain thereon for at least 30 days, or through the injection of a liquid solution of the curing materials into the structure of the fresh raw ham with retention for lesser periods of time, such as 1 to 2 days.

Such preliminarily treated ham is used in the preparation of ham spread by subsequent treatment at an elevated temperature of at least 137° F. for a limited time period such as 4 to 8 hours to accomplish the desired protein coagulation. Thereafter, such commercial batch operations involve deboning and grinding the ham, adding water to restore the weight lost in processing, and adding various spices and flavorings. The resulting comminuted product is transferred to individual containers after which it is retorted to commercial sterility. Thus, the foregoing conventional batch processing technique involves an initial cure, followed by a series of non-continuous processing steps.

SUMMARY OF THE INVENTION

It has now been found that unexpected advantages are obtained when a meat spread is formulated, without an initial cure, through a unique series of continuous processing stages. In particular, it has now been found possible to eliminate the arduous and time-consuming initial curing stage without adversely affecting the quality of the end product, with the attendant advantage of enabling the process to be performed on a continuous basis, as contrasted with the aforementioned conventional batch techniques. Still further, it has been found that the level of sodium nitrite addition, subsequent to initial heating, is significantly below the levels presently used to accomplish a raw meat cure. In particular, useful concentrations have been found to be as low as 25 and up to 100 ppm, while conventional techniques employ at least about 160 ppm per 100 pounds of meat. At the same time, excessive cost factors, normally incurred in a conventional bath curing procedure involving extensive hand labor, are minimized.

For ease of explanation and illustration, the remainder of the description will be directed primarily to the preparation of a cured ham spread. However, it will be appreciated by those skilled in this art that the process will have corresponding application to the preparation of spreads from other cured meat, such as corned beef, pastrami and the like.

In practice, the present invention is accomplished by initial size reduction of fresh ham to pieces in the range of 0.25 to 1.0 pounds. When the source of ham is lean fresh (or frozen) ham, i.e., ham containing less than 10% fat, it has been found to be advantageous to include additional quantities of ham fat. In a later step, further advantages have also resulted from initially reducing such supplemental ham fat by grinding to a size in the range of $\frac{1}{4}$ to 3/16 inch.

Once size reduction has been completed, the ham is transferred to suitable heating vessels, such as steam jacketed and/or steam injection kettles, equipped with removable baskets. Of course, it is essential that the basket openings do not exceed the particle size of the ham. Thus, advantages have resulted from basket openings no greater than 0.25 inches so as to insure that the size reduced ham pieces will be maintained within the confines of the basket during subsequent heating.

Sufficient water is added to cover the ham and the water temperature elevated to the range of b 200-210° C. As a consequence of such heating, it has been found that the larger remaining ham pieces will attain an internal temperature in the range of 120°-150° F., a temperature sufficient to coagulate substantially all of the protein. Following completion of heating, the ham is removed and the drained ham weight recorded. The resulting broth is then removed and stored for subsequent re-addition, as hereinafter described.

The drained ham is ground, preferably in two separate stages, first through a plate having openings in the range of $\frac{1}{8}$-$\frac{3}{8}$ inch, preferably about $\frac{1}{4}$ inch, and thereafter through a plate having openings in the range of 1/16-$\frac{1}{4}$ inch, preferably about $\frac{1}{8}$ inch. The ground ham is transferred to steam jacketed kettles or blenders which are equipped with agitation devices. When additional ground ham fat is to be employed, at this juncture it is blended with the ground ham to accomplish an appropriate adjustment in the fat level of the finished product, i.e., such as into the range of 20-35% by weight of fat.

The total weight of the original raw ham is restored by adding sufficient of the broth to the cooked ham to adjust the weight to that it exhibited as raw ham. Thereafter, sodium nitrite and various other ingredients, including spices, are dissolved through agitation in the broth. The amount of sodium nitrite required to accomplish the cure is found to be substantially decreased from the amounts required by known techniques involving the curing of raw ham. The spiced broth solution is then added to the combination of ham and ham fat. The combined materials are further heated with additional agitation to at least 180° F., and preferably 200° F., for a time sufficient for the conventional color of cured ham to be developed by nitrite reaction. The completely cooked ham is then hot filled into containers and heat processed to accomplish commercial sterility.

DETAILED DESCRIPTION

To further illustrate the novel process of this invention, the following examples are provided. It should be understood that the details thereof are not to be regarded as limitations, as they may be varied as will be understood by one skilled in this art. The percentages included throughout this disclosure are based on the total weight of the composition.

Example I — Ham Spread

A ham spread was prepared in approximately the following proportions.

| Ingredients | Pounds Per 100 Pounds |
|---|---|
| Ham, Lean, Frozen | 66.5 |
| Ham Fat, Frozen | 28.5 |

-continued

| Ingredients | Pounds Per 100 Pounds |
| --- | --- |
| Salt | 2.25 |
| Sugar | 1.75 |
| Spice Mix | 0.6 |
| Sodium Hexametaphosphate | 0.3 |
| Oil Base Liquid Smoke* | 0.063 |
| Sodium Ascorbate | 0.047 |
| Sodium Nitrite | 2.7 gm. |

*Char oil available from Red Arrow Products Co., Manitowoc, Wisconsin.

The lean, frozen ham was first reduced to pieces in the range of 0.25 to 1.0 pounds each. The frozen ham fat was separately reduced by passing through a plate having openings in the range of ¼ to 3/16 inch. The size-reduced ham was transferred to a steam jacketed kettle equipped with a removable basket having openings of approximately 0.25 inches diameter. Sufficient water was added to entirely cover the ham and the water was heated to 210° F. so as to cause the internal temperature of the largest of the ham pieces to attain approximately 125° F. When the temperature was attained, heating was terminated and the resulting broth was separated therefrom and stored. The drained ham was weighed and the weight recorded.

The ham was then ground twice, first through a ¼-inch plate opening and then through a ⅛-inch plate opening. The resulting ground ham was transferred to a steam jacketed kettle equipped with an agitator. Sufficient ground ham fat was then added to and blended with the ground ham by agitation in the kettle to adjust the fat level to 30% by total finish product weight.

The amount of broth to be added back into the ground ham was determined by subtracting the recorded weight of the cooked ham from the initial weight of the raw ham. To that amount of broth was added 2.7 grams of sodium nitrite, which was dissolved therein by agitation. Thereafter, the salt, sugar, spice mix, sodium hexametaphosphate, oil-base liquid smoke and sodium ascorbate were combined with the broth and disbursed with agitation. The broth-spice solution was then added to the combined ham and ham fat and subjected to heating with agitation to 200° F. until the desired color modification developed. The cooked spread was filled into containers which were hermetically sealed and the containers heat processed to obtain commercial sterility.

Example II — Beef Spread

A beef spread was prepared in approximately the following proportions.

| Ingredients | Pounds Per 100 Gal. |
| --- | --- |
| Beef (85% Lean, Frozen) | 97.814 |
| Salt | 1.55 |
| COS Pepper, Black | 0.15 |
| Sodium Hexametaphosphate | 0.3 |
| Onion Powder | 0.15 |
| COS Celery | 0.036 |
| Sodium Nitrite | 2.7 gm. |

The lean, frozen beef was first reduced to pieces in the range of 0.25 to 1.0 pounds each. The size-reduced beef was transferred to a steam jacketed kettle equipped with a removable basket having openings of approximately 0.25 inches diameter. Sufficient water was added to entirely cover the beef and the water was heated to 210° F. so as to cause the internal temperature of the largest of the beef pieces to attain a temperature of approximately 140° F. When the temperature was attained, heating was terminated and the resulting broth was separated therefrom and passed through a fine screen (approximately 0.030 openings). The broth was passed through a separator to separate fat from the broth. The fat was weighed and the broth stored. The drained beef was weighed and the weight recorded.

The beef was then ground twice, first through a ¼-inch plate opening and then through a ⅛-inch plate opening. The resulting ground beef was transferred to a steam jacketed kettle equipped with an agitator. The beef fat was then added to the ground beef in the kettle.

The amount of broth to be added back into the ground beef was determined by subtracting the actual weight of the cooked beef and fat from the initial weight of the raw beef. To that amount of broth was added 2.7 grams of sodium nitrite, which was dissolved therein by agitation. Thereafter, the salt, sugar, spices and sodium hexametaphosphate were combined with the broth and disbursed therein with agitation. The broth-spice solution was then added to the combined beef and beef fat and subjected to heating with agitation to 200° F. The cooked spread was filled into containers which were hermetically sealed and the containers heat processed to obtain commercial sterility.

Although the foregoing invention has been described in some detail by way of illustration and example for purposes of clarity of understanding, it will be apparent that certain changes and modifications may be practiced within the spirit of the invention, as limited only by the scope of the appended claims.

What is claimed is:

1. A process for forming a cured meat spread, consisting essentially of the steps of:
   dividing a predetermined weight of uncooked meat into chunks;
   subjecting said chunks to initial heating in water heated to greater than 150° F. for a time sufficient to cause the chunks to attain an internal temperature in the range of 120°–150° F. so as to coagulate substantially all of the protein therein;
   draining said chunks to provide a separated broth;
   grinding said drained chunks;
   adding sufficient of said previously separated broth to re-establish said predetermined weight;
   adding to said ground chunks various seasonings including sufficient sodium nitrite to cure said meat;
   heating said ground chunks to at least about 180° F. for a time sufficient to cause a color change indicative of protein denaturization of said meat; and
   packaging said ground meat at an elevated temperature sufficient to provide commercial sterility.

2. A process in accordance with claim 1 wherein said chunks are divided so as to exhibit a weight of 0.25 to 1.0 pounds.

3. A process in accordance with claim 1 wherein the initial heating is accomplished with water at about 200°–210° F.

4. A process in accordance with claim 1 wherein said chunks are ground into particles of a size no greater than about ⅛-inch in largest dimension.

5. A process in accordance with claim 1 wherein said grinding is accomplished in two successive stages, by first passing said chunks through openings in the range of ⅛–⅜ inch and, second, by passing the resulting ground chunks through openings in the range of 1/16–¼ inch.

6. A process in accordance with claim 5 and further characterized by a portion of the predetermined weight of said ham chunks being provided by incorporating ham fat which is subjected to separate size reduction.

7. A process in accordance with claim 6 wherein the addition of ground ham fat is accomplished to the extent that the fat content of said ham spread is adjusted into the range of 20-35% by total weight.

8. A process in accordance with claim 1 wherein said chunks are ham.

* * * * *